United States Patent
Isbitsky et al.

(10) Patent No.: US 7,232,253 B2
(45) Date of Patent: Jun. 19, 2007

(54) TIME INDICATOR AND METHOD OF MANUFACTURING SAME

(75) Inventors: Reuben Isbitsky, Herts (GB); Paul Joseph Freedman, Herts (GB); Ian Michael Solomon, Jerusalem (IL); Michael Leon Kagan, Jerusalem (IL)

(73) Assignee: Timestrip (UK) Limited, London (GB)

( * ) Notice: Subject to any disclaimer, the term of this patent is extended or adjusted under 35 U.S.C. 154(b) by 435 days.

(21) Appl. No.: 10/482,984

(22) PCT Filed: Jul. 9, 2002

(86) PCT No.: PCT/GB02/03137

§ 371 (c)(1),
(2), (4) Date: Jun. 14, 2004

(87) PCT Pub. No.: WO03/007088

PCT Pub. Date: Jan. 23, 2003

(65) Prior Publication Data

US 2004/0240324 A1 Dec. 2, 2004

(30) Foreign Application Priority Data

Jul. 11, 2001 (GB) .................................. 0116878.0

(51) Int. Cl.
*G04F 1/00* (2006.01)
*G01D 21/00* (2006.01)
*G01K 1/02* (2006.01)
*G01K 3/00* (2006.01)

(52) U.S. Cl. .................. 368/89; 368/327; 116/206; 116/216; 374/102

(58) Field of Classification Search .................. 368/89, 368/327; 116/206, 216–219; 374/102, 106, 374/159–162
See application file for complete search history.

(56) References Cited

U.S. PATENT DOCUMENTS

| 3,414,415 | A |   | 12/1968 | Broad |  |
|---|---|---|---|---|---|
| 4,229,813 | A |   | 10/1980 | Lilly |  |
| 4,408,557 | A | * | 10/1983 | Bradley et al. | 116/206 |
| 4,903,254 | A | * | 2/1990 | Haas | 368/327 |
| 5,120,137 | A | * | 6/1992 | Ou-Yang | 374/106 |
| 5,446,705 | A | * | 8/1995 | Haas et al. | 368/327 |
| 5,528,563 | A | * | 6/1996 | Tothill et al. | 368/327 |
| 5,602,804 | A |   | 2/1997 | Haas |  |
| 5,667,313 | A | * | 9/1997 | Kapaan et al. | 384/544 |
| 6,741,523 | B1 | * | 5/2004 | Bommarito et al. | 368/327 |

FOREIGN PATENT DOCUMENTS

| DE | 3717025 | 8/1988 |
|---|---|---|
| JP | 63243784 | 10/1988 |
| WO | WO01/26993 | 4/2001 |
| WO | WO01/29525 | 4/2001 |
| WO | WO01/88634 | 11/2001 |

* cited by examiner

*Primary Examiner*—Vit W. Miska
(74) *Attorney, Agent, or Firm*—Townsend and Townsend and Crew LLP

(57) ABSTRACT

A time indicator comprising a first reservoir (13), a migration medium (11) and activating means for bringing liquid from the first reservoir (13) in contact with the migration medium (11) so that after activation the liquid migrates through the migration medium (11) producing a colour change therein. The activating means comprises a second reservoir (16) connected between the first reservoir (13) and the migration medium (11) whereby after activation the liquid travels relatively rapidly from the first reservoir (13) to the second reservoir (16) and then migrates relatively slowly along the length of the migration medium (11) over time.

25 Claims, 5 Drawing Sheets

TIME INDICATOR AND METHOD OF MANUFACTURING SAME

BACKGROUND OF THE INVENTION

The present invention relates to an indicator for showing the product lifetime of the item to which said indicator is attached. More particularly the present invention relates to an indicator which, on activation by applying pressure, measures elapsed time and displays visual indications relating to the product lifetime of the item to which it is attached.

The need to monitor the lifetime of food and drug products is well known, especially where such products deteriorate rapidly after manufacturing or opening. Milk-based products deteriorate rapidly from the time of manufacture, and many types of long-life products (such a canned produce) need to be disposed of within days of opening. Thus, a typical home environment needs a means of monitoring the freshness of the products in the refrigerator. In particular, in situations in which a can is opened or a foodstuff prepared but not consumed immediately in its entirety, the remains will often be placed in a container in the refrigerator. In the absence of a simple aid to show the consumer how long any such container has been in the refrigerator, the danger exists that said remains will deteriorate and pose a health risk. Alternatively, being unaware of how long this package has been in the refrigerator, the over-cautious consumer may dispose of the contents before this becomes necessary. In either case, the need for a simple, inexpensive and reliable indicator or tag for such containers in the refrigerator is clear.

A number of means to accomplish this objective are well known in the art. Co-pending application WO 01/26993, describes a cap containing an integral lifetime indicator where the first opening of the cap causes the activation of the lifetime indicator. However, this approach does not assist the consumer who is preparing a container of "left-overs" within the consumer's premises. Similarly, U.S. Pat. Nos. 4,292,916; 5,053,339; 5,446,705 and 5,633,835 describe colour changing devices for monitoring the shelf-life of perishable products. These devices are initiated by physically bringing into contact reactive layers so that a chemical reaction between them will start, and this action can only conveniently be performed at the time of initial manufacturing. While this approach is suitable for monitoring the degradation of foodstuffs throughout the entire distribution chain, they are unsuitable for user activation and application within the home environment. Further prior art addresses issues associated with applying such devices during the manufacturing and packaging processes. U.S. Pat. No. 5,555,223 describes a process for attaching timing indicators to packaging, including the step of setting the timer's clock at the exact time of production. Thus the above prior art devices require special manufacturing steps at the production-end of the packaging and filling processes, rather than the end-user affixation and activation of a lifetime indicator at the time of use or of storage as envisaged in the current invention. Similarly, time-temperature indicators (TTIs) also address the task of monitoring the entire distribution chain, rather than providing an end-user solution. A number of liquid migration technologies are known in the art, but these typically rely either on the rapid wicking of paper and are thus good for time ranges in the minutes to hours range, or require complex fabrication of the migration media from materials such as gelatine or other gels in order to provide for slower migration, and are thus both complex and expensive to produce.

SUMMARY OF THE INVENTION

According to the present invention, a time indicator comprises a first reservoir, a migration medium and activating means for bringing liquid from the first reservoir in contact with the migration medium so that after activation the liquid migrates through the migration medium producing a colour change therein, characterised in that the activating means comprises a second reservoir connected between the first reservoir and the migration medium whereby after activation the liquid travels relatively rapidly from the first reservoir to the second reservoir and then migrates relatively slowly along the length of the migration medium over time.

As the liquid slowly migrates along the length of the migration medium, a visual indication of the time elapsed is given by the cumulative progress of the colour change. The time indicator may comprise indicia whereby the time elapsed is measured by comparing the progress of the colour change along the migration medium with the indicia.

The presence of the second reservoir allows for rapid dispersion of the liquid away from the first reservoir. This may reduce the risk of the device leaking when the liquid is forced out of the first reservoir. Furthermore, the accuracy of the measurement of elapsed time may also be improved since the measurement depends only on the nature of the migration medium and liquid and is independent of the initial flow of the liquid from the first reservoir.

The second reservoir may take the form of an internal cavity or chamber within the body of the time indicator, an inflatable pocket which inflates after activation or an absorption medium which absorbs the liquid after activation. The first and second reservoirs may be connected by a conduit which may include a material which allows rapid wicking of the liquid from the first reservoir to the second reservoir after activation. The first and second reservoirs may be located towards opposed ends of the migration medium or may be located towards the same end.

The first reservoir may be housed within the second reservoir, for example, the first reservoir may be in the form of a rupturable liquid capsule located within a cavity which forms the second reservoir. Activating the time indicator causes the capsule to rupture releasing liquid into the cavity.

The time indicator is preferably adapted, for example by appropriate selection of the properties of the liquid and the migration medium, so that the migration along the migration medium takes a predetermined time period. The time period may be between thirty minutes and six months, particularly in the days to weeks range. For example, for a time indicator for use with dairy products, the time period may be in the region of two to five days. Alternatively, for a time indicator for use with canned or bottled cooking sauces, the time period may be in the region of one to two weeks. Further examples include eye ointments or nasal sprays which may necessitate a time period of one month, filters, e.g. water filters, which may necessitate a time period of one to three months, cold meats or baby foods which may necessitate a time period of three to seven days or twenty-four to forty eight hours respectively.

The activating means may be pressure activated, for example, applying pressure to the first reservoir may force liquid from the first reservoir into the second reservoir. The activating means may comprise a pressure-rupturable seal separating the first reservoir from the second reservoir and hence separating the first reservoir from the migration medium.

The time indicator may comprise a base layer which may be formed with a dished portion for the first reservoir, a migration layer comprising the migration medium and an intermediate layer sandwiched between the base layer and the migration layer. Each layer and the migration medium may be sheet-like, for example, having the following characteristics, thin and flexible. The intermediate layer may be weakly adhered to the migration layer at one end of the migration medium whereby the second reservoir is formed between the upper and intermediate layers after activation. The second reservoir may in this way be an inflatable pocket.

The time indicator may comprise an at least partially transparent layer mounted to the migration medium or migration layer. The at least partially transparent layer may be in the form of a partially transparent mask. The mask may comprise one or more transparent windows through which the colour change is visible. The transparent windows may act as indicia for measuring the progress of the colour change. One of the indicia may be arranged so that in conjunction with the second reservoir, it provides an indication that the device has been activated. For example, a first transparent window may be aligned above the second reservoir. The transparent windows may be defined by printing directly on the migration medium or migration layer which simplifies the manufacture of the time indicator. The migration medium or layer may be laminated to allow for printing thereon.

The colour change may be from any other colour to red. The migration of the liquid may cause more than one, e.g. two or multiple, colour change in the migration medium. For example, the colour change may have an intermediate colour of yellow prior to the appearance of a red colour.

The liquid may be coloured, whereby a visually observable colour change is produced in the migration medium by the migration of the liquid into pores in the migration medium. Alternatively, the liquid may contain a first reagent and the migration medium may contain a second reagent which reacts with said first reagent, thereby producing a colour change. The migration medium may be impregnated, doped or printed with the second reagent.

The reaction system between said first and second reagent may be selected from the group comprising: chelation of a metal ion by a chelating agent, reaction of an acid/base with a pH indicator, reaction of an electron donor/acceptor with a redox indicator, and the enzymatic reaction between an enzyme and a substrate. The metal ions may be selected from the group consisting of zinc ions, copper ions, iron ions and calcium ions; chelating agents are selected from the group consisting of 1,10 phenanthroline, zincon, and 2,2'-biquioline (cupron) and PAR; acid/base reagents are selected from the group consisting of hydrochloric acid, citric acid, ascorbic acid, sodium hydroxide and sodium hydrogen phosphate; pH indicators are selected from the group consisting of bromothymol blue, methyl red and cresol red; electron donor/acceptors are selected from the group consisting of bleaching powder and vanadium salts; and redox indicators are selected from the group consisting of n-phenylanthrancilic acid and bleachable dyes.

The liquid may be a viscous liquid, such that the viscosity of said liquid controls the rate of liquid migration through the migration medium. The liquid may contain an oil and an oil-soluble dye or may contain water, a water-soluble dye and, in some cases, also a chemical to control the viscosity of said liquid.

The mechanism for said migration may be diffusion or capillary action. The migration medium may be selected from the group consisting of polymeric micro-porous materials such as polyolefin plastics, cellulose-based materials including paper, sol-gels, and particle-filled Teflon. The migration medium may comprise a micro-porous polymeric material with a silica filler. The migration medium may be composed of a combination of the named porous materials, such as paper dipped in a sol-gel solution.

The indicator may incorporate an adhesive backing for attachment to the products and packages to be stored. The indicator may comprise means defining a migration passage along the length of the migration medium. The defining means may be in the form of a seal. The migration passage reduces the amount of liquid which is required and reduces any accidental seepage of liquid from the indicator.

According to a second aspect of the invention, there is provided a method of manufacturing a time indicator comprising providing a base layer formed with a dished portion for a liquid reservoir, an intermediate layer having an inlet and a migration layer comprising a migration medium; bonding the base layer to the intermediate layer with the inlet aligned with the dished portion; feeding liquid through the inlet into the dished portion to form a liquid reservoir; and partially bonding the migration layer to the intermediate layer whereby when the time indicator is activated liquid travels rapidly from the liquid reservoir to a chamber which is formed between the migration layer and the intermediate layer and then migrates slowly along the length of the migration medium over time.

The intermediate layer preferably comprises a vent to allow air from the first reservoir to be vented as the first reservoir is filled with liquid during manufacture. Thus, the intermediate layer may be considered to act as a layer which facilitates filling.

The method may comprise printing on part of the surface of the intermediate layer to resist bonding between the migration layer and the intermediate layer. In this way, a second reservoir in the form of an inflatable pocket may be formed after activation of the indicator. The pocket forms between the migration layer and the intermediate layer in the region of the part of the surface which resists bonding. The method may comprise defining a migration passage along the length of the migration medium, for example by forming a seal in the migration layer which defines the migration passage.

The method may comprise bonding an at least partially transparent layer to the migration layer and may comprise defining indicia on the transparent layer whereby the time elapsed is measured by comparing the progress of the colour change along the migration medium with the indicia. Alternatively, the method may comprise printing indicia on the migration layer whereby the time elapsed is measured by comparing the progress of the colour change along the migration medium with the indicia.

According to another aspect of the invention, there is provided a lifetime indicator device comprising a liquid reservoir containing a liquid with a dissolved red dye, a micro-porous medium composed of a polyolefin plastic with a primarily silica filler, a partially transparent mask placed above said micro-porous medium such that, on bringing the liquid in contact with said medium said liquid slowly diffuses through said medium yielding a colour change to red, where the front of said colour change slowly proceeds along said micro-porous medium and is viewed via a mask containing indicia that relate the progress of said front to the lifetime of the item to which the time indicator is attached.

The invention will now be described in connection with certain embodiments with reference to the following illustrative figures so that it may be more fully understood.

DETAILED DESCRIPTION OF THE DRAWINGS

Figure 1A:
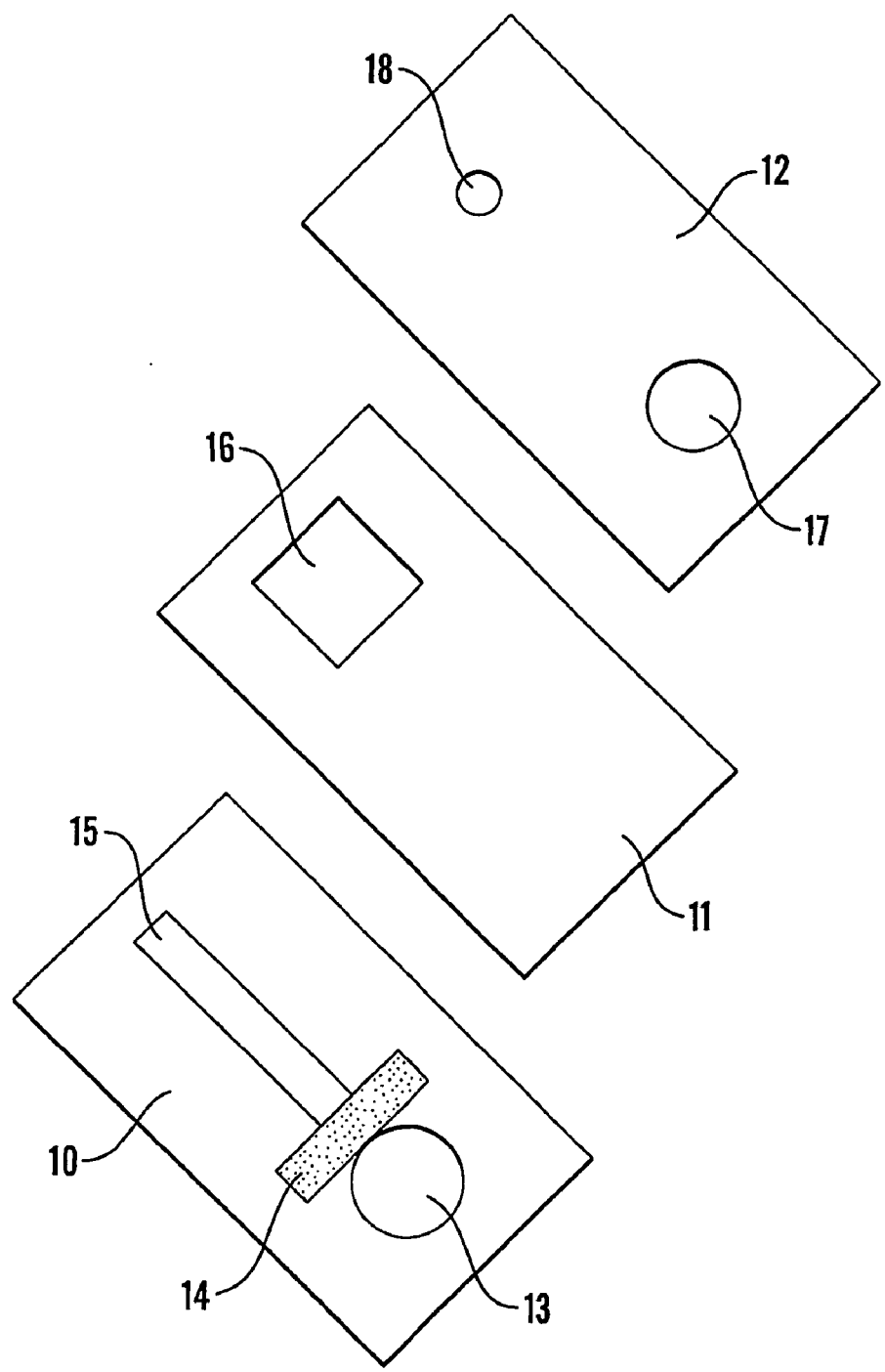
FIG. 1A is an exploded plan view of the components of an indicator according to a first embodiment of the present invention.
Figure 1B:
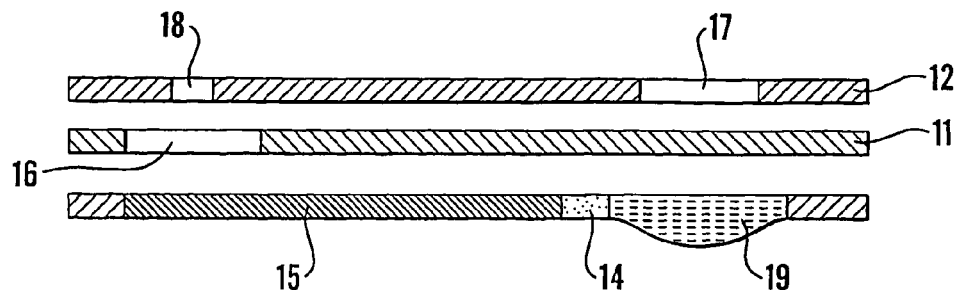
FIGS. 1B and 1C are exploded cross-sections of the indicator of FIG. 1A before and after activation.

In the following figures similar numbers are used to designate similar parts. An exemplary time indicator (the device) according to the present invention is shown in FIGS. 1A and 1B. The device comprises a base layer 10 containing a first liquid reservoir 13, a central layer 11 comprising a migration medium, and a partially transparent upper layer 12 which provides two windows 17, 18 through which the progress of the liquid through the migration medium may be viewed.

The base layer 10 constitutes a lower seal for the indicator as a whole. The base layer 10 comprises a dished portion 19 which forms a button and contains the first reservoir 13 which serves to drive the liquid-migration mechanism. The dished portion 19 may be thermoformed. The underside of said base layer 10 may be an adhesive surface serving to attach the indicator to the item being monitored. The upper surface of the base 10 is attached by strong adhesive to the central layer 11 except in two places: along a weak seal 14, and along a liquid conduit 15. The liquid conduit 15 has a first end connected to the seal 14 and a second end leading to a second reservoir in the form of an open section or cavity 16 in the middle layer 11 which connects to the migration medium.

Once assembled, the device is activated by compressing the dished portion 19 whereby the increased pressure on the liquid in the reservoir causes the weak seal 14 to rupture. The liquid flows rapidly down the liquid conduit 15 and up into the cavity 16 in the middle layer 11. Said middle layer 11 comprises a laminated package encapsulating a porous or micro-porous medium which acts as the migration medium. After entering the cavity 16, the liquid begins its slow-migration along said medium.

The upper layer 12 comprises transparent windows 17, 18 (indicia) showing the progress of the said slow-migration process, thereby acting as a graphic mask. One window 18 is positioned above the cavity 16 in the middle layer 12 and a second window is positioned above the intended end-point. When the device is activated, the liquid flows into cavity 16 and a colour change is seen through the first window 18 which shows the device has been activated. A colour-change viewed at the second window 17 shows that the intended end-point (corresponding to the lifetime of the item being monitored) has been reached.

Figure 2A:
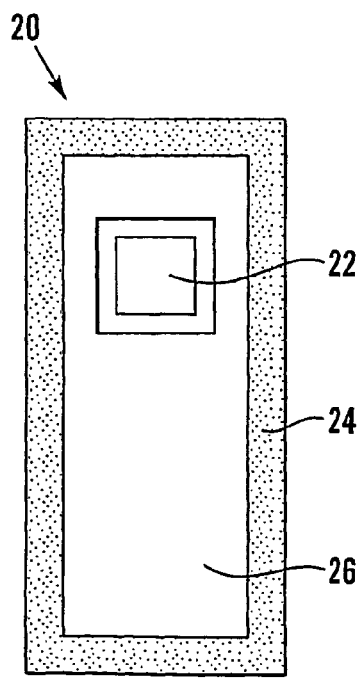
FIGS. 2A and 2B shows the details of a middle layer which may be used in the indicator of FIG. 1.
Figure 2B:
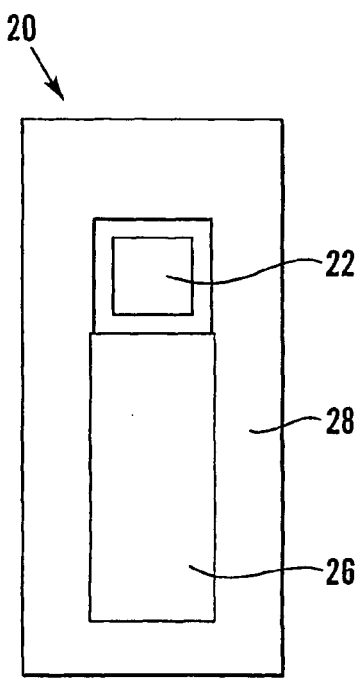

Referring now to FIGS. 2A & 2B, there are seen two exemplary embodiments of the middle layer of the device, the middle layer being the slow liquid-migration component. In FIG. 2A, the middle layer 20 comprises a laminated strip 26 of a porous or micro-porous material which serves as the slow-migration medium for the liquid that arrives into the second reservoir or cavity 22 defined by the cut-out section of said medium. Said liquid migration is prevented from extending beyond the edges of the layer by a pressure heat seal 24 applied around the edges of the layer, said sealing operation essentially closing the pores of the micro-porous material.

In an alternative embodiment shown in FIG. 2B, the middle layer 20 comprises an encapsulated strip 26 of a micro-porous material which serves as the slow-migration medium for the liquid that arrives into the cavity 22 cut into said medium. Said liquid-migration is prevented from extending beyond the strip 26 by the laminate-to-laminate bond in the surrounding margin 28.

Figure 1C:
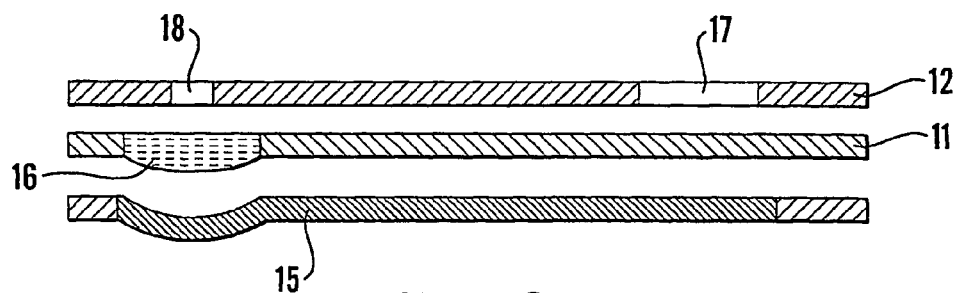
Figure 3:
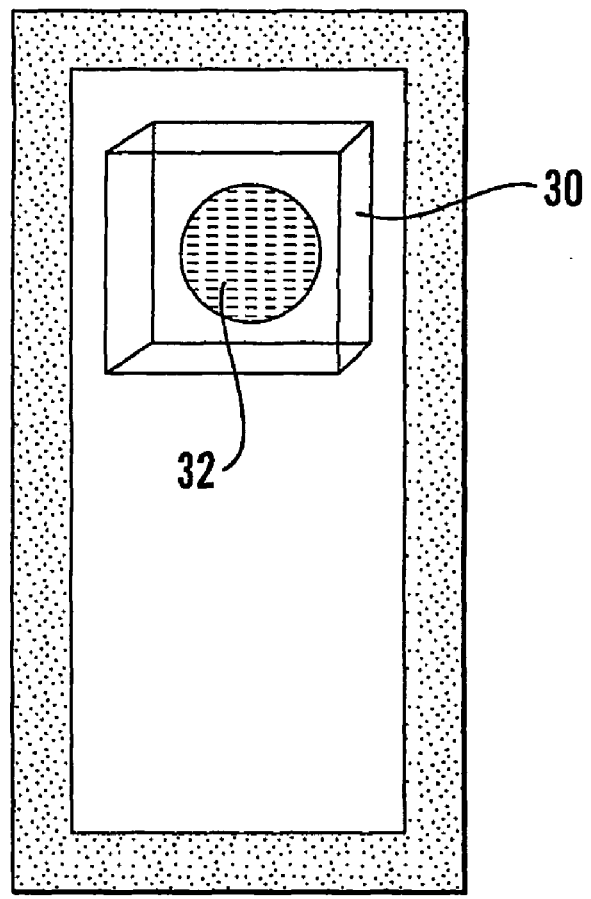
FIG. 3 shows an alternative indicator.

Referring now to FIG. 3, an alternative embodiment of the liquid release mechanism is shown. According to this embodiment a first reservoir in the form of a rupturable capsule 30 containing the liquid is placed within a second reservoir in the form of a cavity 32. Pressure exerted above and below said cavity 32 causes the release of the liquid into the cavity and hence the start of the liquid migration. In this embodiment, the lower layer of the device only serves to provide a lower seal, and thus the thermoformed reservoir and conduit of FIG. 1 are obviated.

Figure 4A:
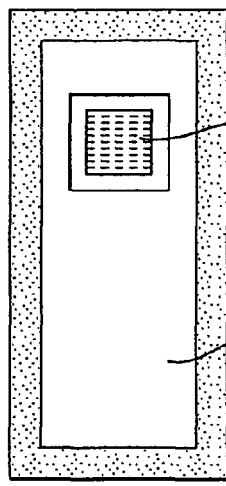
FIGS. 4A–4F show an indicator in which the progress of the slow liquid-migration process over time is visible.
Figure 4B:
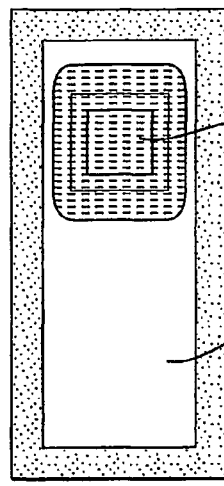
Figure 4C:
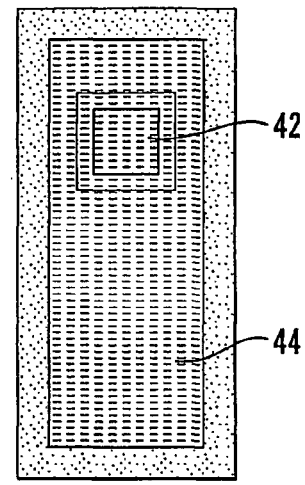
Figure 4D:
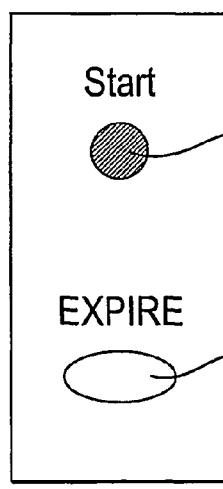
Figure 4E:
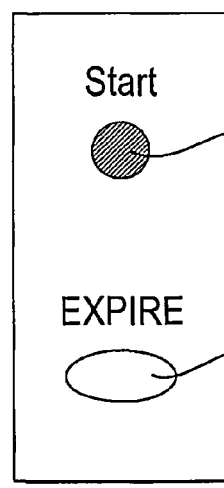
Figure 4F:
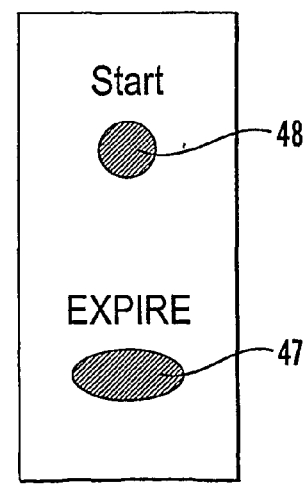

Referring now to FIGS. 4A to 4F, the progress over time of the liquid-migration front in the migration medium is shown in FIGS. 4A to 4C. The colour-change as viewed through the said partially transparent upper layer of the device is shown in FIGS. 4D to 4F. Initially, as shown in FIGS. 4A and 4D respectively, the liquid is contained within the cavity and a colour change is only visible in the first or start window 48. This shows that the device has been activated.

As time progresses, as shown in FIG. 4B, the liquid starts to migrate out from the cavity and begins to colour the edges surrounding the cavity 42. As shown in FIG. 4E, no colour change is visible in the second or expire window. Over time the coloured area progressively and cumulatively expands lengthwise along the indicator by migrating down the migration medium 44. Finally, as shown in FIG. 4C, all or almost all of the migration medium has changed colour and as shown in FIG. 4F, a colour change is visible in the second window indicating that the product has expired.

As will be clear to one skilled in the art, various types of graphic design may be employed for the expiry/lifetime end-point, including but not limited to various lines, curves, ellipses, rectangles or points. Similarly, indicia showing the progress of the liquid-migration front may also be employed, including but not limited to various arrows, curves, lines and points of different sizes.

Furthermore, each embodiment may be adapted to include numerous additional indicia to show the status of the time indicator. Such indicia (not shown) can include graphic symbols showing the gradual advance to said end-point. The starting colour seen through the windows may be the same as the background colour of the upper layer, and thus any colour change stands out clearly. The final colour may be red; a transition to red being readily understandable as a sign that the item being monitored should be disposed of.

Figure 5A:
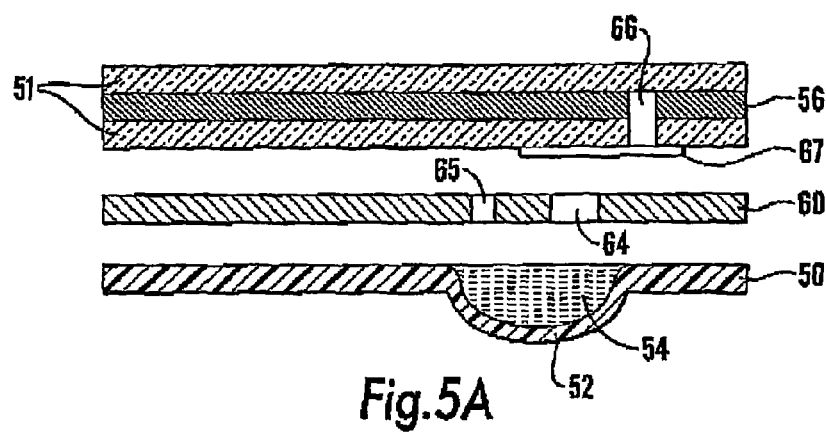
FIGS. 5A and 5B show exploded cross-sectional views of an alternative indicator before and after activation.
Figure 5B:
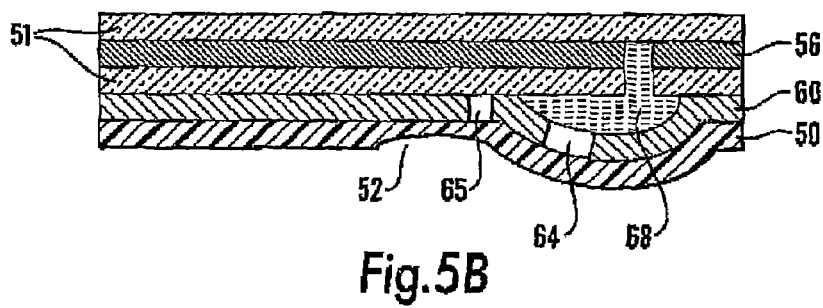

FIGS. 5A and 5B show an alternative indicator comprising a base layer 50, an upper migration layer 56 comprising a migration medium and an intermediate layer 60 sandwiched between the upper layer 56 and the base layer 50. The upper migration layer 56 is laminated, i.e. covered on both surfaces by a laminate layer 51. The upper surface of the migration layer 56 is printed with indicia showing the start-point and the end-point, thus avoiding the need for a separate partially transparent upper layer for printing. Furthermore, the printing of the migration layer 56 may define transparent windows as in earlier embodiments.

The base layer 50 is preferably made of PVC and is formed with a dished portion 52 which contains a first liquid reservoir 54. The intermediate layer is provided with a vent 65 and an inlet 64 which connects the liquid reservoir 54 to a small cavity 66 in the migration-layer 56. The intermediate layer 60 is sealed to the migration layer 56 by a thermal adhesive applied to an upper surface of the intermediate layer 60 except in a print area 67 covering part of the lower surface of the migration layer 56. The print area 66 is printed with a material, e.g. paint, which forms a weak adhesive bond with the thermal adhesive which may be W60 and W60 pre-applied aliphatic polyester water-based urethane adhesives from Lmarr (Glen Ellen, Calif., US).

The device is activated by depressing the dished portion 52 which forces liquid from the reservoir 54 through inlet 64 into the cavity 66. The cavity 66 expands or inflates over the print area 67 to form a second reservoir in the form of an internal pocket 68 as shown in FIG. 5B. Once the pocket 68 is formed, the button or dished portion 52 remains in its depressed state. The liquid then begins to diffuse over time through the migration medium as described above.

Figures 6A, 6B, 6C:
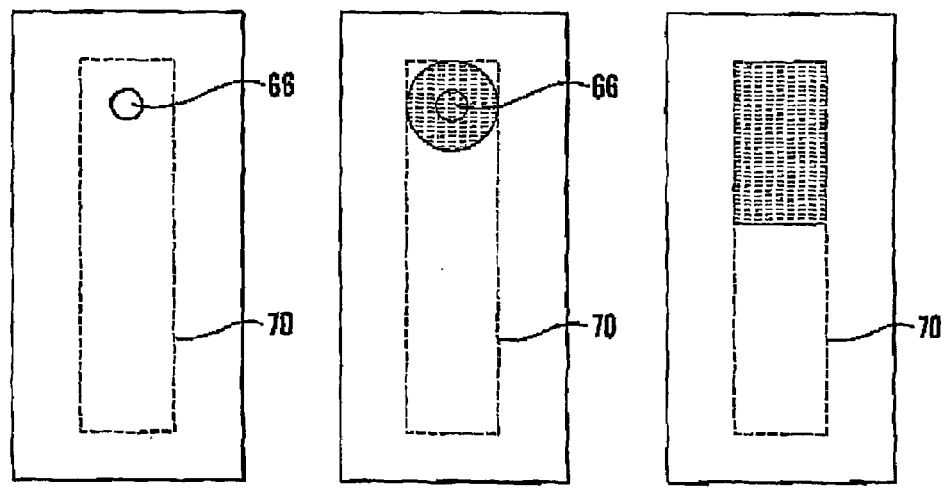
FIG. 6 shows the slow liquid-migration process in the indicator of FIGS. 5A and 5B over time.

FIGS. 6A to 6C show the device of FIGS. 5A and 5B with a mechanism to channel the migration of the liquid into a narrow path through the migration medium. Heat and pressure is used to form a seal 70 which defines the narrow path. FIG. 6A shows the device before activation and thus no liquid is present in the cavity 66. Shortly after activation the cavity 66 is filled with liquid and liquid begins to diffuse into the migration medium as shown in FIG. 6B. Over time the liquid continues to advance along the migration medium along the narrow path defined by the seal 70 as shown in FIG. 6C.

The embodiment of FIGS. 5A to 5B may be manufactured as follows:
1) A plastic PVC layer is thermoformed at 150 to 160° C. to form a base layer 50 having a dished portion 52;
2) A second plastic layer having an inlet 64 and a vent 65 is glued to the base layer 50 to form an intermediate layer 60 with the inlet being aligned with the dished portion;
3) Liquid is fed through the inlet into the dished portion to form a first reservoir. As the liquid fills the reservoir, air is evacuated from the dished portion through the vent 65. The intermediate layer 60 may be considered to be a filling-facilitator layer and enables rapid manufacturing speeds to be achieved;
4) Adhesive is applied to the free surface of the intermediate layer 60;
5) A migration layer 56 comprising a migration medium is printed over part of its surface with a material, e.g. paint, which forms a weak bond with the adhesive on the intermediate layer;
6) The intermediate layer 60 and the migration layer 56 are bonded together at about 90° C., and
7) Optionally, heat (in the range 150–200° C.) and pressure are applied to the upper surface to melt the migration layer thereby forming a seal or partial seal which defines a narrow migration passage.
8) Optionally, the migration layer 56 may be printed with indicia or so as to define transparent windows to view start and end points of the migration. Alternatively, an additional partially transparent layer with such indicia may be bonded to the migration layer.

In each of the embodiments the migration medium may be a porous material such as a micro-porous polymer, for instance a polyolefin plastic (with a primarily silica filler) such as Teslin® (PPG Industries, Inc., Pennsylvania, USA) or a polyethylene with a silica filler such as Artisyn™ (Daramic Inc., Owensboro, Ky., USA). The liquid used can be any viscous liquid with the appropriate (e.g. red) colouration, for example an edible oil such as corn oil containing an oil-soluble red-dye such as Oil Red EGN (Aldrich Chemical Company, Inc., USA). In this example, the rate of liquid migration is determined by the viscosity of the liquid and the thickness and density of the migration medium.

Advantageously, the choice of an edible oil with a food dye ensures that the device will remain non-toxic, even in the event that it splits open. A further advantage of said oil/dye combination is that, as this liquid migrates along the migration medium, a two-stage colour-change front is produced as the underlying yellow colour of the oil precedes the appearance of the red colour. Thus a graduated colour change occurs, first to yellow as an intermediate colour, and then to red. Advantageously, said colour change sequence is intuitive to the consumer due to the familiarity of consumers with traffic lights which first turn yellow before becoming red. Similarly, a red colour is associated with danger and thus said combination provides an optimal colour change sequence for the device of the present invention.

An alternative liquid/dye combination utilizes a water-soluble dye (e.g. a red food dye) in water, together with an additive, such as polyethylene glycol (PEG), to control the viscosity of the resulting liquid and thus the rate of its migration. Additionally, a combination of dyes with differing retention times can be employed, so as to cause one colour (say yellow) to appear shortly before the final colour (say red) dominates.

Alternatively, the migration medium may be a microporous doped sol-gel, the liquid may be a solution of a zinc salt such as zinc chloride, and the colour-changing reaction system may be a chelation reaction. As the zinc solution proceeds to migrate slowly through the doped sol-gel medium, it reacts with the dopant; in this case the chelating agent 4-(2-pyridylazo)resorcinol monosodium salt, hereinafter PAR, thereby yielding a colour change from yellow to red.

In one embodiment, the support material for the doped sol-gel may be standard laser quality paper (80 g/m$^2$) paper which is cut into 1 cm by 2.5 cm strips and dip-coated with the PAR-doped sol-gel. The doped sol-gel liquid may be prepared by first adding a 5 ml solution of tetraethoxysilane (TEOS) to a stirred solution consisting of 10 ml ethanol, 1.6 ml triply distilled water, 4 drops of concentrated (33%) hydrochloric acid (HCl) and 0.1 g of PAR. After stirring for a further 5 minutes, 0.3 g of a surfactant such as CTAB (hexadecyltrimethyl-ammonium bromide) is added and stirred until the solution becomes homogeneous. The solution is stirred for a further two hours. The paper may be dipped into this sol-gel liquid by holding the paper strip at one by a dipping machine; lowering it into the non-stirred solution and then withdrawing it at a rate of 0.08 cm/sec. It is then left to dry at 50° C. in an oven for at least 24 hours to complete curing.

In this example, the rate of liquid migration is determined by the pH during preparation of the sol-gel, which controls the resulting pore size. This choice of reaction system is especially advantageous because, even if the device were to split open, no dangerous chemicals would be released. Zinc solution is non-toxic (being an acceptable constituent of drinking water at levels up to 5 mg/l) and the PAR remains entrapped as a dopant within the sol-gel matrix and therefore can not leach out.

As is obvious to one skilled in the art, a number of alternative migration media and a number of alternative reaction mechanisms are feasible. A number of microporous media enable a slow-migration effect to be implemented; examples include Empore™ particle-filled Teflon (available from Minnesota Mining and Manufacturing Company, St. Paul, Minn., USA). Other materials suitable for a migration media are cellulose-based materials such as paper where both capillary action and diffusion may contribute to the migration effect.

A number of alternative chemical systems capable of producing a similar colour change to that of the above described embodiments are listed below:

1. To implement other chelation reactions, alternative chelating agents such as 1,10 phenanthroline, zincon, or 2,2'-biquioline (cupron) can be incorporated or doped into the porous medium while alternative liquid reagents that would migrate into the porous medium can include solutions of metal ions such as copper ions, iron ions and calcium ions.
2. To implement acid/base reaction systems, suitable pH indicators including bromothymol blue, methyl red, cresol red can be incorporated or doped into the migration medium, and suitable acid/base liquid reagents that would migrate into the migration medium can include the acids: hydrochloric acid, citric acid and ascorbic acid and the bases: sodium hydroxide and sodium hydrogen phosphate.
3. To implement redox reactions, redox indicators such as n-phenylanthrancilic acid or a bleachable dye can be incorporated or doped into the migration medium while alternative liquid reagents that would migrate into the migration medium can include solutions of bleaching powder or of vanadium salts.
4. To implement an enzymatic reaction, an enzyme such as a lipase can be incorporated or doped into the migration medium together with a pH indicator while a liquid substrate such as tricaproin would migrate into the migration medium. In one embodiment the reaction product of the enzymatic reaction of a lipase and tricaproin is caproic acid; said acid producing a colour shift in the pH indicator.

The above chemical colour-change system can be implemented within the context of the present invention by ensuring that one of the chemical reagents is present in the migrating liquid, while the other is present in the migration medium. Means known in the art for placing a chemical within a migration medium include doping (as per the sol-gel description above); dipping and printing of the chemical into or on to said medium.

As set out above, activation of each embodiment is by the simple application of pressure on a portion of said indicator, the invention has the advantage of being easy to use and may have foolproof operation. Furthermore, by basing the construction of the indictor on printable, sheet-like liquid migration media; fabrication may be performed using simple technologies such as printing, dipping, stamping and lamination. Thus, the time indicator may have a simple and inexpensive manufacture. For example off-the-shelf media may be adapted to provide an indicator according to the invention. The time indicator of may also be suitable for attachment to containers or other items stored in the refrigerator or freezer and may use liquid which do not freeze, for example mixtures of propylene glycol and water at various concentrations or synthetic oils designed to operate at sub-zero conditions.

This may be particularly useful for the longer time frames, e.g. six months.

It will thus be seen that according to the present invention a simple and inexpensive time indicator for consumers is described. While the invention has been shown herein in what is presently conceived to be the most practical and preferred embodiments thereof, it will be apparent to those of ordinary skill in the art that many modifications may be made thereof within the scope of the invention, which scope is to be accorded the broadest interpretation of the appended claims so as to encompass all equivalent structures and devices.

The invention claimed is:

1. A time indicator comprising a first reservoir, a migration medium and activating means for bringing liquid from the first reservoir in contact with the migration medium so that after activation the liquid migrates through the migration medium producing a colour change therein, characterised in that the activating means comprises a second reservoir connected between the first reservoir and the migration medium whereby after activation the liquid travels relatively rapidly from the first reservoir to the second reservoir and then migrates relatively slowly along the length of the migration medium over time;
   wherein the second reservoir is in the form if an inflatable pocket which inflates after activation.

2. A time indicator according to claim 1, wherein the first and second reservoirs are located towards opposed ends of the migration medium and are connected by a conduit.

3. A time indicator according to claim 1, wherein the first reservoir is housed within the second reservoir.

4. A time indicator according to claim 1, wherein the activation means comprises a pressure-rupturable seal between the first and second reservoirs.

5. A time indicator according to claim 1, comprising a base layer formed with a dished portion for the first reservoir, a migration layer comprising the migration medium and an intermediate layer sandwiched between the base layer and the migration layer.

6. A time indicator according to claim 5, wherein the intermediate layer is weakly adhered to the migration layer at one end of the migration medium whereby the second reservoir is formed between the upper and intermediate layers after activation.

7. A time indicator according to claim 1, comprising an at least partially transparent layer mounted to the migration medium.

8. A time indicator according to claim 1, comprising indicia whereby the time elapsed is measured by comparing the progress of the colour change along the migration medium with the indicia.

9. A time indicator according to claim 8, wherein the indicia are in the form of transparent windows through which the colour change is visible.

10. A time indicator according to claim 8 wherein the indicia are defined by printing on the migration medium.

11. A time indicator according to claim 1, wherein the properties of the liquid and the migration medium are selected so that migration along the migration medium takes a predetermined time period.

12. A time indicator according to claim 11, wherein the time period is between thirty minutes and six months.

13. A time indicator according to claim 1, wherein the liquid is a viscous liquid and the viscosity of the liquid controls the rate of liquid migration through the migration medium.

14. A time indicator according to claim 11, wherein the liquid is selected from the group consisting of an oil mixed with an oil-soluble dye and water mixed with a water-soluble dye and a chemical to control its viscosity.

15. A time indicator according to claim 1, wherein the migration medium is selected from the group consisting of polymeric micro-porous materials, cellulose-based materials, sol-gels, and particle-filled Teflon.

16. A time indicator according to claim 15, wherein the migration medium comprises a micro-porous polymeric material with a silica filler.

17. A time indicator according to claim 1, wherein the liquid is coloured, whereby a colour change is produced in the migration medium by the migration of the liquid along the migration medium.

18. A time indicator according to claim 1, wherein the liquid contains a first reagent and the migration medium contains a second reagent which reacts with said first reagent, thereby producing the colour change.

19. A time indicator according to claim 18, wherein the reaction system between said first and second reagent is selected from the group comprising: chelation of a metal ion by a chelating agent, reaction of an acid/base with a pH indicator, reaction of an electron donor/acceptor with a redox indicator, and the enzymatic reaction between an enzyme and a substrate.

20. A time indicator according to claim 19, wherein the metal ions are selected from the group consisting of zinc ions, copper ions, iron ions and calcium ions; chelating agents are selected from the group consisting of 1,10 phenanthroline, zincon, and 2,2'-biquioline (cupron) and PAR; acid/base reagents are selected from the group consisting of hydrochloric acid, citric acid, ascorbic acid, sodium hydroxide and sodium hydrogen phosphate; pH indicators are selected from the group consisting of bromothymol blue, methyl red and cresol red; electron donor/acceptors are selected from the group consisting of bleaching powder and vanadium salts; and redox indicators are selected from the group consisting of n-phenylanthrancilic acid and bleachable dyes.

21. A time indicator according to claim 1, wherein the colour change is to red.

22. A time indicator according to claim 1, wherein migration of the liquid causes more than one colour change in the migration medium.

23. A time indicator according to claim 22, wherein the colour changes first to yellow then to red.

24. A time indicator according to claim 1, comprising an adhesive backing.

25. A time indicator according to claim 1, comprising means defining a migration passage along the length of the migration medium.

* * * * *